United States Patent Office 3,428,849
Patented Feb. 18, 1969

3,428,849
SYSTEM FOR OPERATING PICKUP TUBES
Hiroshi Watanabe and Tomoya Okuda, Kamakura-shi, and Yoshio Takamura, Yokohama-shi, Japan, assignors to Tokyo Shibaura Electric Co., Ltd., Kawasaki-shi, Japan, a corporation of Japan
Filed Dec. 7, 1964, Ser. No. 416,205
Claims priority, application Japan, Dec. 6, 1963, 38/65,319; Dec. 26, 1963, 38/69,796
U.S. Cl. 315—11           6 Claims
Int. Cl. H01j 31/48

ABSTRACT OF THE DISCLOSURE

A television camera tube having an electron beam producing means and a photocathode arranged respectively at both ends of an envelope, a target provided between said means and photocathode in the envelope, means to generate a magnetic field intensity disposed to surround said envelope so that the field intensity becomes minimum on the surface of the target and maximum on the surface of said photocathode, and means to produce such a magnetic field intensity that the beams form only three or less focussing loops between said target and said electron beam producing means.

---

Figures 1, 2:
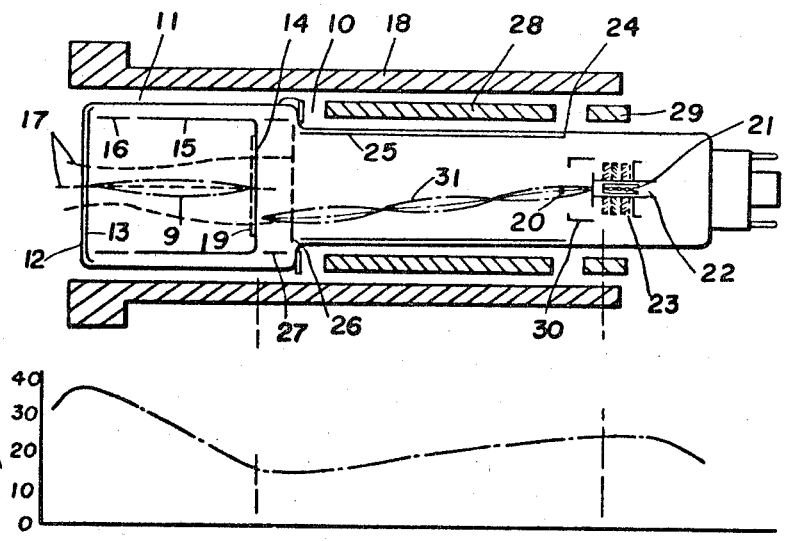

This invention relates to electromagnetic focussing and electromagnetic deflecting type electron beam scanning pickup tubes or image tubes wherein the intensity of a focussing magnetic field near the photoelectric surface at the image section is made higher than the field intensity near the target, and more particularly to improvements in the system of operating such pickup tubes.

As the typical pickup tube of the type referred to above, there have been used image orthicon tubes having a photoelectric surface which emits photoelectrons in response to light images, and wherein the emitted photoelectrons are accelerated to impinge upon a target. The target is usually a thin film insulator such as glass which acts to emit secondary electrons when photoelectrons impinge thereon to form an image of positive charge corresponding to the light image. On the other end of the pickup tube is mounted an electron gun which emits an electron beam adapted to scan the target from the rear of the target at a low speed. Thus the beam is decelerated substantially to zero volt at the surface of the target. The image of the electric charge formed on the target will be discharged by the scanning action of low speed electron beams and the remaining beam will travel as a return beam and will be collected by a secondary electron multiplier element after passing through substantially the same path as the forward beam. The collected electrons will be multiplied and obtained from the tube, as image signals. To operate the tube a focussing magnetic field is formed in parallel with the longitudinal axis of the tube so as to cause the photoelectrons or electron beam to travel along the line of magnetic force. In practice, however the electron beam travels along with the line of magnetic force as its axis, thus tracing a helical path. The focussing magnetic field is formed by a focussing coil disposed to surround the tube whereas the deflection of the beam for the purpose of scanning is provided by a deflection coil similarly surrounding the tube.

As is well known in the art the number of loops formed by the electrons travelling along a helix is determined by the intensity of the focussing magnetic field, the potential applied to the focussing electrode and the distance of electron travel. For instance, in a conventional 4½ inch image orthicon, the portion one one side of its target acted upon by the photoelectrons acts as the image section and the portion on the other side of its target acted upon by the electron beam acts as the scanning section. Thus, a system of operation as shown in the following table has been usually employed.

TABLE

|  | Image section | Scanning section |
| --- | --- | --- |
| Number of focussing loops | 3~4 | 5~6 |
| Focussing potential (v.) | 600 | 70~150 |
| Maximum intensity of the focussing magnetic field (gausses) | 120 | 60 |
| Distance of electron travel (cm.) | ca. 11 | ca. 27 |

However, such a system of operation is disadvantageous in that the electric power consumption in the deflection and focussing coils is large and generally amounts to about one half of the total power consumption of a television camera. Thus, the heat generated in these coils becomes substantial, which means that due consideration should be paid in order to adequately cool the image orthicon to maintain it at the most suitable operating temperature. Also the heat generated in a camera casing which houses the tube will become excessive, and particularly in transistorized cameras it becomes difficult to maintain the system at a high degree of stability. Moreover, the cooling device for the camera becomes elaborate, the camera apparatus bulky which renders difficult and complex the camera handling and operation. Further, in such an apparatus or system of operation, the quality of picture, especially the stability of its resolution is badly affected by the variation in the source voltage. Thus, it is impossible to sufficiently satisfy the purpose of stabilizing the tube itself which is strongly desired in the art in order to render unnecessary any regulation of the whole apparatus.

It is therefore an object of this invention to provide an improved apparatus, e.g., system of operating an electromagnetic focussing and electromagnetic deflecting type low speed electron beam scanning pickup tube device wherein deflecting power and power consumption in the focussing coil are reduced, stability of the picture quality with respect to the variation in the source of supply for electrodes is improved and control of temperature of the apparatus and the tube itself is rendered easier due to the reduction in power consumption.

A further object of this invention is to provide a system of operating an electromagnetic focussing and electromagnetic deflecting type, low speed electron beam scanning tube device in which the size and weight of the deflection and focussing coils and of the device are reduced.

While the specification concludes with claims particularly pointing out and distinctly claiming the subject matter which are regarded as this invention, it is believed that the invention will be better understood from the following description taken in connection with the accompanying drawing in which:

FIG. 1 shows a schematic longitudinal sectional view of one embodiment of this invention; and FIG. 2 shows a graph representing a distribution of the focussing magnetic field in the embodiment shown in FIG. 1.

Referring now to the accompanying drawing, FIG. 1 illustrates a longitudinal section of a 4½ inch type image orthicon which is a kind of an electromagnetic focussing and electromagnetic deflecting type low speed electron beam scanning pickup tube comprising a photoelectric surface 13 deposited on the inner surface of a face plate 12 at an enlarged end of a tubular envelope 10 made of glass, for example. As is well known in the art, when a light image of an object is focussed on the photoelectric surface by means of an optical system (not shown) the surface will emit photoelectrons of the amount dependent upon brightness of the light image. Although not shown, a potential of about −600 v. to −400 v. is applied from a source of supply to a target 14 in the form of a glass film and a cup shaped electrode 15 adapted to support the target. The photoelectrons emitted from the photoelectric surface are accelerated by said target cup electrode 15 and a cylindrical accelerating electrode 16 maintained at a potential of from −400 v. to −200 v. with respect to the electrode 15, and are directed towards the target 14. The path of the travel of the accelerated photoelectrons is in a direction of magnetic lines of force which are produced substantially in parallel with the longitudinal axis of the tube. Thus the photoelectrons will travel along the lines of magnetic forces and then along a locus of a helical loop 9. The magnetic field having such magnetic lines of force 17 is produced by a focussing coil 18 in the form of a solenoid positioned to surround the outer casing 10. Photoelectrons accelerated and directed in this way are then caused to impinge upon the target 14 to emit secondary electrons so as to form an image of positive charge on the surface of the target which corresponds to said light image. The emitted secondary electrons will be collected by a secondary electron collecting mesh 19 which is disposed in close proximity to the surface of the target which is facing the photoelectric surface 13. The mesh electrode is maintained at the same potential as the cathode cup electrode. It will be understood that the above mentioned various electrodes constitute an image section.

As shown in the drawing an electron gun 22 including a cathode electrode 21 adapted to emit an electron beam 20 is provided on the end of the tube opposite to a target 14. And a secondary electron multiplier 23 is disposed to surround the electron gun. The electron beam emitted by the electron gun will be focussed by a focussing electrode 25 comprising an electrically conductive film deposited upon the inner wall of a reduced diameter section 24 between the target 14 and the electron gun 22 and by the focussing magnetic field created by said focussing coil 18 to be directed towards the target. Meanwhile the electron beam will pass through a field mesh 26 positioned near the target in opposing relation and then will be decelerated by means of an annular decelerating electrode 27 and finally reach the surface of the target. It is now assumed that, with respect to the cathodes electrode, the focussing electrode 25 is maintained at 16 v., the field mesh at about 160 v. and the decelerating electrode 27 is at a fixed potential between −100 v. and +250 v. It is to be understood that these potentials are supplied from a suitable source of voltage supply, not shown in the drawing.

A deflection coil 28 is disposed to surround the outside surface of the reduced diameter section 25 of the tube corresponding to the focussing electrode 25 to produce a deflection magnetic field and an aligning coil 29 is disposed coaxially with said coil on the side of said deflection coil near the electron gun to produce the aligning magnetic field.

More particularly, the electron beam emitted from the electron gun will be aligned to be in the correct position of the tube by the action of the aligning magnetic field and then will be deflected by the deflecting magnetic field to scan the target surface. Thus, the electron beam 20 will be decelerated by the action of the decelerating electrode, etc. to scan the target surface at substantially zero speed. By this scanning the image of positive charge on the target surface will be discharged and the surplus electron beam will be repelled back towards the electron gun as a return beam through substantially the same path as the scanning beam and thus will be collected by the secondary electron multiplier element 23 by the action of driving electrode 30 which is maintained at a potential of from +200 v. to +250 v. The portion of the target 14 scanned by the electron beam will assume an equilibrium condition so as to have a negative equilibrium potential of about 2 to 3 volts with respect to the cathode electrode thus completing preparation for the next writing in. The return beam collected by the secondary electron multiplier element 23 will be multiplied and is then derived out as the image signals. The above described components constitute the scanning element of the tube.

In this embodiment, the focussing magnetic field which functions to direct the photoelectrons and the electron beam in the requisite direction is distributed as shown by a graph illustrated in FIG. 2 which represents the distribution of intensity (in gausses) of the magnetic field along the longitudinal axis of the tube which is plotted to correspond to that shown in FIG. 1.

By comparing FIGS. 1 and 2 it will be clear that the lines of magnetic field produced by such a distribution will have a peak near the photoelectric surface 13, then slope down towards the target section and then will be parallel to or slightly diverge towards the electron gun. The intensity of the maximum magnetic field is nearly 37 gausses at the image portion, 20 gausses at the target portion and about 28 gausses at the scanning portion. Slight increase in the intensity of the magnetic field near the electron gun is effective to avoid the effect of such external magnetic field as terrestrial magnetic field.

The mode of focussing the electrons to describe loops after travelling a helical path along the lines of magnetic force can be expressed by the following equation.

$$n = k \cdot \frac{H \cdot l}{\sqrt{E}} \qquad (1)$$

where $n$ represents the number of loops, $l$ the distance of electron travel, H the intensity of the focussing magnetic field, E the potential across the distance of electron travel and $k$ a constant.

Consequently as the degree of degradation in the resolution of the tube with respect to the increments $\Delta E$ and $\Delta H$ respectively of the intensity of the focussing magnetic field H and potential E caused by a variation in the source potential is expressed by $\Delta n/n \times 100$ (percent), the Equation 1 can be reduced to $$\frac{\Delta n}{n} = \frac{\Delta H}{H} - \frac{l}{2} \cdot \frac{\Delta E}{E} \qquad (2)$$

which shows that less number of loops $n$ is advantageous for the variation in the source voltage.

Further, to deflect the beam in a low speed electron beam pickup tube a horizontal and a vertical deflection coils which are normal with each other are utilized as the deflecting coil shown in FIG. 1 and a current of saw teeth wave is passed through these coils to create a deflecting magnetic field. The following equations represent the mode of deflection where $\dot{H}o$ represents the resultant magnetic field, $\dot{H}$ the focussing magnetic field, $\dot{H}d$ the deflecting magnetic field and $\theta$ the deflection angle.

$$\dot{H}o = \dot{H} + \dot{H}d \qquad (3)$$

$$\theta = \tan^{-1} \frac{\dot{H}d}{\dot{H}} \qquad (4)$$

Thus, as the deflection power Pd is proportional to the power of the deflection angle of the electron beam or $Pd \propto \theta$, the intensity of the deflecting magnetic field Hd will also be determined naturally. For example, when the intensity of the focussing magnetic field H is reduced to one half, Hd may also be one half.

Based on the above consideration we contemplate to give a distribution of the focussing magnetic field as shown in FIG. 2 for the embodiment illustrated in FIG. 1 so as to greatly reduce the maximum as well as the overall intensity of the magnetic field when compared with the conventional mode of operation of the device.

More particularly, in the mode of focussing the photoelectrons in the image section of the illustrated embodiment it is possible to make the number of the loops 9 equal to 1 and the number of loops at the scanning section to 2 or 3 thereby making it possible to improve the quality of picture, especially the degree of stability of the resolution by 4 to 5 times at the image section and by 2 to 3 times at the scanning section and to limit the strain of the figure over the entire surface within a range of from 0.5 to 1% when compared with the prior art devices in case of variation in the supply voltage.

Further, in a transistorized television camera device embodying this invention it was found that its horizontal deflection power was four watts, vertical deflection power two watts, and focussing coil power was about five watts so that it was possible to operate the camera device with a power of only 1/9 of that of similar conventional cameras.

Thus in pickup tubes which are operated with higher intensity of focussing magnetic field near the photoelectric surface than that of the focussing magnetic field near the target, novel merits described in connection with the above embodiment can be provided by decreasing to less than 3 the number of the beam focussing loops at the scanning section thus greatly reducing the intensity of magnetic field than the conventional devices and yet providing better image signals.

While the invention has been described as embodied in a transistored 4½ inch image orthicon camera device it will be understood that this invention is also applicable to camera devices of electromagnetic focussing and electromagnetic deflecting type low speed electron scanning pickup tubes having other image elements such as 2 inches or 3 inches type image orthicons.

Summarizing the above this invention provides an improved operating system for pickup tube devices in which the stability of pictures against variation in source voltage is improved, deflection power and power consumption in the focussing coil are reduced, the physical size and weight of the coil and camera are decreased and temperature control of the camera device and the image pickup tubes is easy.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

What is claimed is:

1. In an apparatus for operating an electromagnetic focussing and electromagnetic deflecting type low speed electron beam scanning pickup tube having an image section including a photoelectric surface which emits photoelectrons in response to a light image, a target adapted to form an image of electric charge corresponding to said light image when photoelectrons impinge thereupon; a scanning section including an electron gun adapted to generate a scanning electron beam for discharging said electric charge on said target, and means to collect electrons produced by the scanning action of said electron beam; magnetic means to generate a focussing magnetic field within said pickup tube disposed to provide lines of magnetic force along the longitudinal axis of said tube, the improvement therein wherein said magnetic field has a higher intensity near said photoelectric surface than near said target; and limiting means to limit to less than three the number of focussing loops of said electron beam between said electron gun of said scanning section and said target.

2. The apparatus according to claim 1 wherein said magnetic means to generate said focussing magnetic field comprises a focussing solenoid coil disposed to coaxially surround said pickup tube.

3. The apparatus according to claim 1 wherein the magnetic means are so disposed that the intensity of magnetic field is less than about 37 gausses near said photoelectric surface, less than about 20 gausses near said target and less than about 28 gausses at said scanning section.

4. In the method of operating an electromagnetic focussing and electromagnetic deflecting type low speed electron beam scanning pickup tube wherein there is an image zone including a photoelectric surface which emits photoelectrons in response to a light image, and a target adapted to form an image of electric charge corresponding to siad light image when said photoelectrons impinge thereupon; a scanning zone including an electron beam source adapted to generate a scanning electron beam for discharging said electric charge image on said starget, and there are means to collect electrons produced by the scanning action by said electron beam; and magnetic means to generate a focussing magnetic field within said pickup tube comprising lines of magnetic force along the longitudinal axis of said tube, the improvement in said operating method wherein said magnetic field was a higher intensity near the photoelectric surface of the image section than near said target; and the number of focussing loops of said electron beam between said electron gun of said scanning section and said target are limited to less than three.

5. The method of operating according to claim 4 wherein the intensity of magnetic field is less than about 37 gausses near said photoelectric surface, less than about 20 gausses near said target and less than about 28 gausses at said scanning section.

6. A television camera tube having an envelope, an electron beam producing means in one end of the envelope, a photocathode opposite to said means in the other end of said envelope, a target structure in the other end of the envelope and spaced from the photocathode for receiving an electron image from the photocathode, means surrounding said envelope which generates such a magnetic field as is minimum on the surface of said target and is maximum on the surface of said photocathode, and magnetic means to generate such a magnetic field intensity that the beams form only three or less focussing loops between said target and said electron beam producing means.

References Cited

UNITED STATES PATENTS 3,158,774    11/1964    Fleming et al. _____ 313—84
3,329,856    7/1967    Foote _____ 315—14 X RODNEY D. BENNETT, *Primary Examiner.*

J. P. MORRIS, *Assistant Examiner.*

U.S. Cl. X.R.

313—84